United States Patent [19]
Peterson

[11] 3,765,734
[45] Oct. 16, 1973

[54] RAILWAY TRACTION MOTOR AND AXLE SUPPORT BEARING THEREFOR

[75] Inventor: David W. Peterson, Oak Brook, Ill.

[73] Assignee: General Motors Corporation, Detroit, Mich.

[22] Filed: July 24, 1972

[21] Appl. No.: 274,398

[52] U.S. Cl. .............................................. 308/132
[51] Int. Cl. .......................................... F16c 17/00
[58] Field of Search .................................. 308/132

[56] References Cited
UNITED STATES PATENTS
2,249,472  7/1941  Hanna ............................... 308/132

Primary Examiner—Charles J. Myhre
Assistant Examiner—Frank Susko
Attorney—J. L. Carpenter et al.

[57] ABSTRACT

An electric traction motor for a railway vehicle includes spaced detachable bearing caps cooperating with the motor frame to retain a pair of axially spaced split cylindrical axle support bearings having outwardly facing thrust flanges. The plane of the bearing split lines is arranged transverse to the plane between the bearing caps and motor frame to maintain the bearing split portions out of the heavily loaded zones of the bearings. Proper orientation of the bearings is provided by spaced recesses on the inner sides of the bearing flanges, which engage abutment means on the traction motor frame. The recesses and abutments provide for installation of the bearings in the traction motor frame while clamped in assembled position around the associated axle.

6 Claims, 5 Drawing Figures

Patented Oct. 16, 1973  3,765,734

RAILWAY TRACTION MOTOR AND AXLE SUPPORT BEARING THEREFOR

BACKGROUND OF THE INVENTION

This invention relates to railway traction motors and to axle support bearings for such motors and, more particularly, to an improved axle support bearing arrangement for a railway traction motor having novel features of bearing construction, including means to aid the installation and retention of such bearings in a desired installed position.

A widely used arrangement for railway electric traction motors used, for example, in diesel electric locomotives, involves means supporting each traction motor within the locomotive truck by suspending one side of the motor directly from the truck frame and connecting the other side of the motor directly to the locomotive axle which is driven by the motor. Common means for the latter connection involve a pair of bearing caps detachably secured to the traction motor frame and retaining a pair of split cylindrical bearings within which the axle is journalled.

In the commonly used arrangement, the split lines of the cylindrical axle support bearings are arranged generally in alignment with, or parallel to, the plane of the split lines which separate the axle caps from the traction motor frame, an arrangement which permits installation of the separate bearing segments, the axle and bearing caps in assembly with the traction motor frame by a relatively simple step-by-step procedure. This arrangement, however, has the disadvantage that under certain load conditions the driving forces exerted by the traction motor on the axle cause the primary loads to be absorbed along the position of the bearing split line, which may be detrimental from a bearing wear and durability standpoint.

It is recognized that traction motor support bearing performance may be improved by changing the bearing design so that the split line forms a plane transverse to the plane formed by the split between the bearing caps and traction motor and arranged so that the bearing splits are out of the primary load zone. An arrangement for this purpose is shown, for example, in U.S. Pat. No. 2,249,472 Hannah issued July 15, 1941. To be acceptable, however, such an arrangement must permit a suitable procedure for installation and retention of the bearings in position within the traction motor, as well as construction features to provide adequate performance after installation. Such relocation of the bearing split lines of traction motor support bearings, while known in the prior art, has not been adopted in common practice, due, apparently, to shortcomings of the specific arrangements proposed.

SUMMARY OF THE INVENTION

The present invention provides an improved axle support bearing arrangement in conjunction with a railway traction motor which incorporates the desirable feature of location of the bearing split lines out of the load zone while providing construction features to assure ease of installation and retention of the bearings in position, along with adequate bearing performance under operating conditions.

Accordingly, it is a feature of the present invention that it provides a railway traction motor having axle support bearings arranged with the split lines out of the load zone and arranged for ease of installation and retention of the bearings in their operating positions.

A further feature of the invention is that the complimentary bearing segments are formed as mirror images providing a bearing which may be interchangeably used at either end of the traction motor, thus reducing inventory requirements.

A more specific feature of the invention is that guide recesses are provided on the inner edges of the bearing thrust flanges and cooperate with abutment means on the traction motor frame to guide and maintain the bearing segments in their assembled positions.

A still further feature of the invention is the provision of an annular groove around the bearing segments to receive a removable strap or clamp adapted to hold the bearing segments in assembly with the associated axle for installation as a unit in the traction motor frame.

A still further feature of the invention is the provision of a flange lubricating wick at the split line location of the bearing opposite the lubrication window, the lubricating wick being split in two halves in adjacent portions of the separate segments of each bearing and yielding a construction wherein all discontinuities in the bearing surface are located outside of the primary load zone.

These and other features and advantages of the invention will be more clearly understood from the following description of certain preferred embodiments, taken together with the accompanying drawings.

DESCRIPTION OF THE PREFERRED EMBODIMENTS

Figure 1:
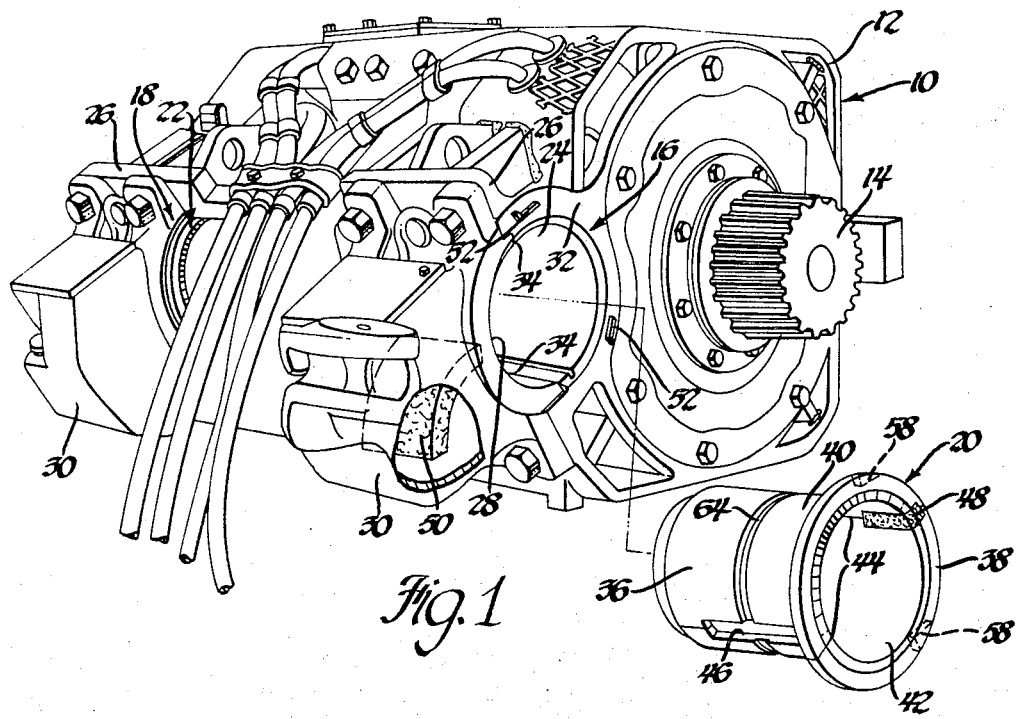
FIG. 1 is a pictorial view showing a railway electric traction motor including axle support bearing means formed according to the invention.

Referring now to the drawings in more detail, numeral 10 generally indicates an electric traction motor for a railway vehicle. Motor 10 has a frame 12 which supports therewithin a plurality of field coils and a rotatable armature (not shown), the latter being connected to an output drive gear 14.

The motor frame is adapted to be supported in a railway vehicle truck by connection of one side of the motor frame through suspension means (not shown) directly with the motor frame and connection of the other side of the motor frame through means to be subsequently described with one of the vehicle driving axles (not shown) which is driven by the motor 10 through connection with the drive gear 14.

The means for supporting the motor on the driving axle comprise a pair of generally cylindrical, axially spaced, split bearing receiving portions 16, 18, having received therein axially split cylindrical bearings 20, 22. The bearing receiving portions are jointly defined by part-cylindrical recesses 24 formed in extensions 26 of the traction motor frame and by complimentary part-cylindrical recesses 28 formed in spaced bearing caps 30 which are detachably secured to the extensions 26 of the traction motor frame. The outer edges of the bearing receiving portions comprise radially extending thrust surfaces 32 extending over portions of both the frame and the associated bearing caps.

The connection of the bearing caps to the frame defines split lines 34 which lie in a plane somewhat angled to the vertical and having a relation with the drive gear 14 such that under certain operating conditions driving loads passed to the supported axle are supported by the bearing receiving portions 16, 18 at or near the split lines 34.

The cylindrical bearings 20, 22 each include an axially extending cylindrical portion 36 with a radial flange 38 on the axially outer end of the cylindrical portion and extending radially outwardly therefrom. In assembly, the cylindrical portions 36 of the bearings are received within the recesses 24, 28 of the bearing receiving portions and the radial flanges 38 have their inner surfaces engaging the thrust surfaces 32 of the bearing receiving portions.

Bearings 20, 22 are identical, each being formed of a pair of semi-cylindrical bearing segments 40, 42 which are mirror images of one another and are engagable at their circumferential edges to form split lines 44 lying in a common plane. Upon installation, the plane of the bearing split lines 44 is arranged at approximately right angles to the plane of the bearing cap-to-frame split lines 34 so that the bearing split lines lie out of the primary load zone of the axle on the bearing during all operating conditions.

It may be noted that the installed positions of the bearings is such that bearing 20 is arranged with its segment 40 generally above segment 42, while bearing 22 is reversed with its segment 42 generally above segment 40.

Each of the bearings 20, 22 is provided with a lubrication window 46 formed along one split line and half in each of the bearing segments and a flange lubricating wick 48 formed along the split line opposite window 46 and half in each of the bearing segments. The wick 48 extends axially of the bearing for a distance from the outer edge and radially along the outer thrust bearing surface of the radial flange 38 for a part of its width and provides means for passing lubricant from the cylindrical portion of the bearing to the radial thrust flange portion. Lubrication is supplied to the bearings through wicks 50 located within the bearing caps and extending into oil sumps contained therein, the wicks being arranged to extend through the lubrication windows 46 of the bearings into contact with the associated driving axle.

Figure 2:
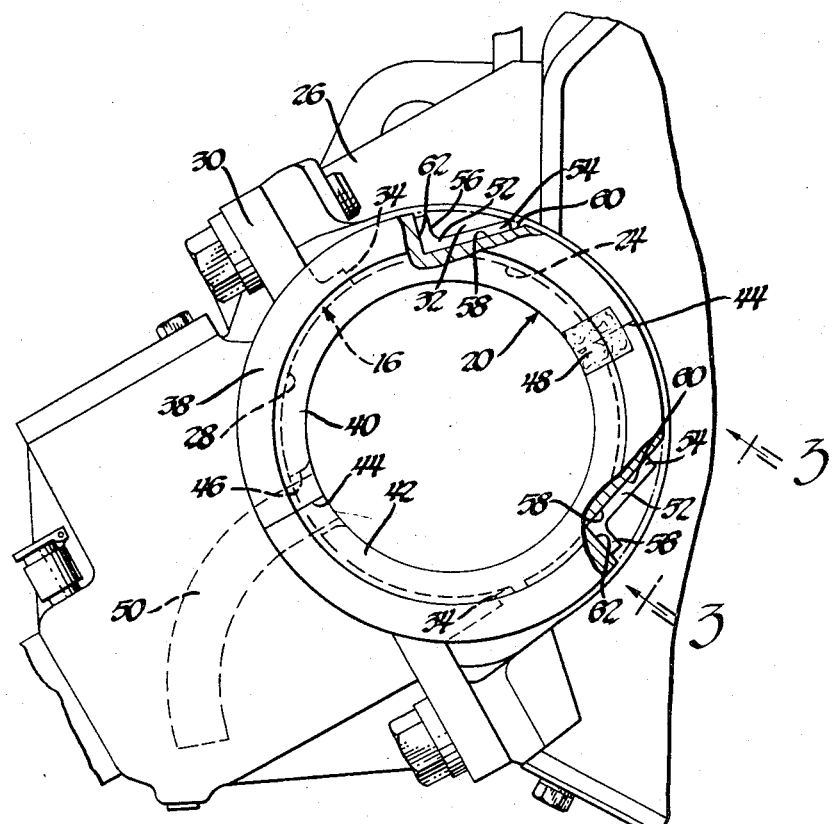
FIG. 2 is a fragmentary side elevational view showing details of the bearing portion of the traction motor of FIG. 1 and having portions cut away to reveal the means for guiding and positioning the bearing.
Figure 3:
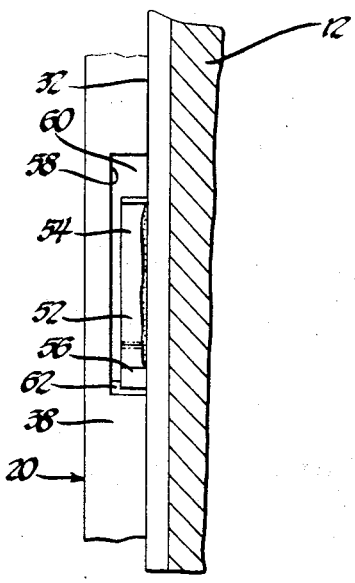
FIG. 3 is a fragmentary view showing the positioning means as viewed in the direction of the arrows 3—3 of FIG. 2.

To properly position the bearings 20, 22 in assembly, the frame 12 is provided with abutment means extending from the radial thrust surfaces 32. In the embodiment of FIGS. 1 – 3, the abutment means comprise short angle members 52 which are preferably welded to the frame thrust surfaces and have longer legs 54 angled slightly inwardly from the direction of the split line plane of the bearings and shorter legs 56 angled slightly outwardly from the direction of the split line plane formed by the connections of the bearing caps to the frame.

On installation, these angle members engage the sides of guide recesses 58 formed on the inner portions of the radial flanges 38 of the bearings and disposed equidistant from the bearing split lines, one in each of the two bearing segments 40, 42. The recesses extend through less than the complete thickness of their respective bearing flanges and have angled surfaces 60, 62 which engage and are in alignment with the corresponding surfaces of the respective legs of the angle members. An annular groove 64 is provided around the outer surface of the cylindrical portion 36 of each of the bearings for a purpose to be subsequently described.

The preferred manner of installation of the bearings in their respective receiving portions is to assemble the bearings in position on their associated axle, where they may be held assembled by the use of a flexible strap or clamp (not shown) applied around each bearing in its annular groove 64. The axle and bearing assemblies are then moved as a unit into position in the traction motor frame recesses 24, the bearing caps first having been removed. Upon movement of the assemblies into position, the angled surfaces 60 of the bearing guide recesses are engaged by the longer legs 54 of the angle members to guide the bearings into their proper positions, after which engagement of the shorter legs 56 with the surfaces 62 of the recesses prevents any rotational movement of the bearings within the recesses. The clamps may then be removed from the bearing grooves 64 and the bearing caps installed, positively retaining the bearings and their associated axle in assembly with the traction motor.

Figure 4:
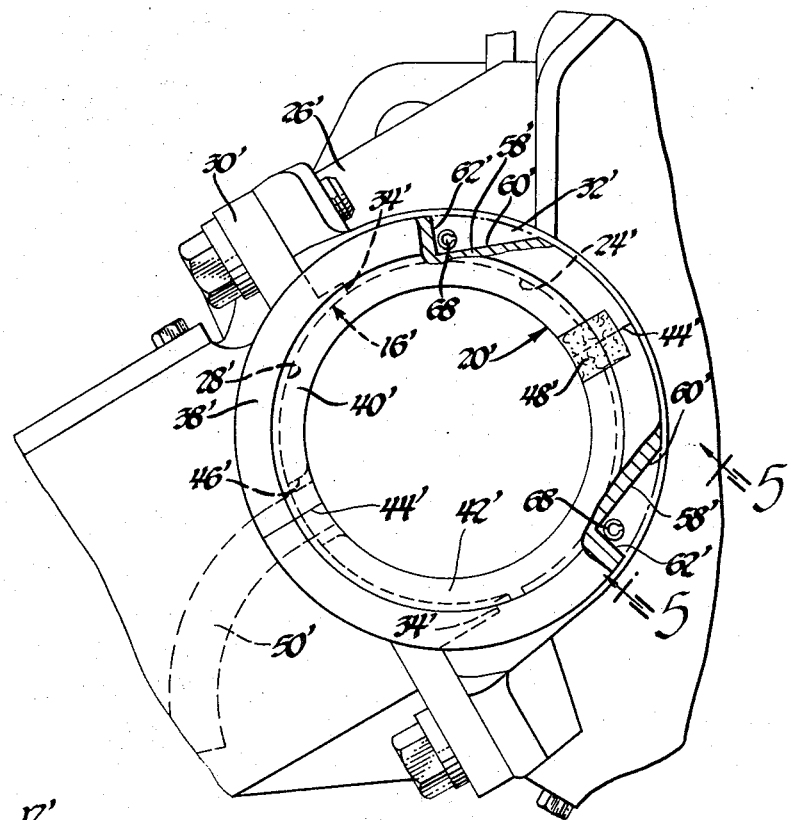
FIG. 4 is a fragmentary elevational view showing the bearing portion of a traction motor having an alternative embodiment of guiding and retaining means according to the invention.
Figure 5:
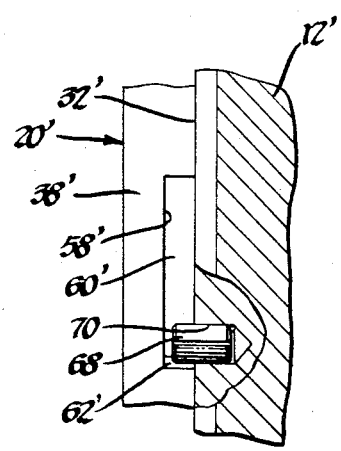
FIG. 5 is a fragmentary view partially in section showing the retaining means of FIG. 4 as viewed in the direction of the arrows 5—5 of FIG. 4.

The alternative embodiment illustrated in FIGS. 4 and 5 is identical to that described above (primed reference numerals being used for like parts) except that the abutment means provided on the traction motor frame and cooperating with the guide recesses 58 of the bearings comprise short roll pins 68, which are pressed into drilled holes 70 of the traction motor frame. The roll pins cooperate with the angled surfaces 60, 62 of the bearing guide recesses to guide the bearings to proper position upon assembly and maintain the bearings in that position thereafter.

While the invention has been described by reference to certain preferred embodiments, it should be understood that numerous changes could be made within the spirit and scope of the inventive concepts disclosed and, accordingly, the invention is intended to be limited only by the language of the following claims.

I claim:

1. In a railway vehicle electric traction motor of the type adapted to be supported in part by an adjacent axle driven by said motor,
    a frame,
    a pair of spaced bearing caps detachably secured to said frame and defining therewith two generally cylindrical axially spaced split bearing receiving portions having, at their outer ends, outwardly facing radial surfaces,
    a pair of axially split cylindrical bearings received within said bearing receiving portions and adapted to surround and engage such axle to support said motor thereon, each of said bearings being formed of two arcuate segments separated along a plane transverse to the dividing plane between said bearing caps and said frame, each of said bearings having a radial thrust flange at one end thereof engaging the radial surface of its respective bearing receiving portion, each said thrust flange having a pair of guide recesses formed one in each bearing segment and spaced on opposite sides of said separating plane between the respective segments, said recesses being located adjacent the bearing receiving portion radial surfaces of said frame and opening axially inwardly toward said radial surfaces and transversely outwardly in a direction parallel to said separating plane, and a pair of guide abutments extending outwardly from said frame radial surfaces, said abutments extending into said recesses so as to properly position their respective bearings in said traction motor during and after installation of said bearings with their associated axle.

2. The combination of claim 1 wherein the thrust flange recesses of each of said bearings and thier associated guide abutments are disposed equidistant from the separating plane between the bearing segments, said bearings being identical and interchangeably receivable in either of said bearing receiving portions of the traction motor.

3. The combination of claim 2 wherein the radially inner side of each of said recesses is angled toward the separating plane of said bearing segments in a manner to provide greater clearance for initial entry of the intermediate bearing flange portion between the abutments with cam-like guidance to the proper installed position, and each of said bearings further includes a lubrication window through the cylindrical portion at the split line covered by the respective bearing cap, said window extending equally into the adjacent bearing segments, and a flange lubrication wick formed half in each bearing segment at the split line portion extending into said frame, said wick being carried in a recess extending axially along a portion of a bearing surface of the cylindrical bearing opposite the lubrication window and continuing radially outwardly along a portion of a bearing surface the thrust flange.

4. The combination of claim 2 wherein each of said bearings further includes an annular groove around the cylindrical bearing exterior for installation of a retainer strap to maintain said bearing segments on an axle for installation as an assembly into the respective motor frame bearing receiving portion.

5. An axle support bearing for a railway traction motor, said bearing comprising a pair of complimentary semi-cylindrical bearing segments flanged at one end, said segments being engagable at their split-line defining circumferential edges to form a cylindrical split bearing having an annular thrust flange at one end thereof, a lubrication window formed half in each of said segments and extending radially through the cylindrical portion of said bearing at one of the split line locations, a flange lubricating wick received in and connecting axially extending inner surfaces of the bearing cylindrical portion with radially extending outer surfaces of the bearing thrust flange, said lubricating wick being received half in each of said segments and located at the split line location opposite said lubrication window, and a pair of guide recesses formed on the axially inner side of said thrust flange, spaced outwardly of said wick and equidistant from said split line, one recess being formed in each of said bearing segments, said recesses opening axially inwardly and transversely outwardly in a direction parallel to the plane of the bearing split lines.

6. The bearing of claim 5 and further comprising an annular groove around the cylindrical outer surface of said bearing and adapted to receive a retainer strap to hold said bearing segments on an axle for installation as an assembly into a traction motor frame.

* * * * *